(12) United States Patent
Langhammer

(10) Patent No.: US 9,189,200 B1
(45) Date of Patent: Nov. 17, 2015

(54) MULTIPLE-PRECISION PROCESSING BLOCK IN A PROGRAMMABLE INTEGRATED CIRCUIT DEVICE

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 327 days.

(21) Appl. No.: 13/829,729

(22) Filed: Mar. 14, 2013

(51) Int. Cl.
*G06F 7/483* (2006.01)

(52) U.S. Cl.
CPC .................................... *G06F 7/483* (2013.01)

(58) Field of Classification Search
None
See application file for complete search history.

(56) References Cited

U.S. PATENT DOCUMENTS

| | | |
|---|---|---|
| 3,473,160 A | 10/1969 | Wahlstrom |
| 3,697,734 A | 10/1972 | Booth et al. |
| 3,800,130 A | 3/1974 | Martinson et al. |
| 3,814,924 A | 6/1974 | Tate |
| 3,896,299 A | 7/1975 | Rhodes |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,575,812 A | 3/1986 | Kloker et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barkan |
| 4,754,421 A | 6/1988 | Bosshart |
| 4,777,614 A | 10/1988 | Ward |

(Continued)

FOREIGN PATENT DOCUMENTS

| | | |
|---|---|---|
| EP | 0 158 430 | 10/1985 |
| EP | 0 326 415 | 8/1989 |

(Continued)

OTHER PUBLICATIONS

Altera, "DSP Blocks in Stratix III Devices", Chapter 5, pp. 1-42, Mar. 2010.

(Continued)

*Primary Examiner* — David H Malzahn
(74) *Attorney, Agent, or Firm* — Ropes & Gray LLP; Jeffrey H. Ingerman

(57) ABSTRACT

A specialized processing block in a programmable integrated circuit device is configurable to perform floating-point arithmetic operations at selectable different precisions. The specialized processing block includes a plurality of different respective types of floating-point arithmetic operator structures. For each respective type of floating-point arithmetic operator structure, respective control circuitry for partitions the respective type of floating-point arithmetic operator structure to select between a first precision for which the respective type of floating-point arithmetic operator structure is not partitioned, and at least a second precision, less than the first precision, for which the respective type of floating-point arithmetic operator structure is partitioned into at least two smaller ones of the respective type of floating-point arithmetic operator structure.

31 Claims, 10 Drawing Sheets

(56) References Cited

U.S. PATENT DOCUMENTS

| | | |
|---|---|---|
| 4,791,590 A | 12/1988 | Ku et al. |
| 4,799,004 A | 1/1989 | Mori |
| 4,823,260 A | 4/1989 | Imel et al. |
| 4,823,295 A | 4/1989 | Mader |
| 4,839,847 A | 6/1989 | Laprade |
| 4,871,930 A | 10/1989 | Wong et al. |
| 4,893,268 A | 1/1990 | Denman et al. |
| 4,908,788 A | 3/1990 | Fujiyama |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 4,999,803 A | 3/1991 | Turrini et al. |
| 5,068,813 A | 11/1991 | Thoen |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,373,461 A | 12/1994 | Bearden et al. |
| 5,375,079 A | 12/1994 | Uramoto et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,623,377 A | 4/1997 | Behrens et al. |
| 5,631,848 A | 5/1997 | Laczko et al. |
| 5,631,859 A * | 5/1997 | Markstein et al. ............ 708/513 |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,052,773 A | 4/2000 | DeHon et al. |
| 6,055,555 A | 4/2000 | Boswell et al. |
| 6,064,614 A | 5/2000 | Khoury |

(56) References Cited

U.S. PATENT DOCUMENTS

| | | |
|---|---|---|
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | De Lange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,108,772 A | 8/2000 | Sharangpani |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,346,824 B1 | 2/2002 | New |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,385,632 B1 | 5/2002 | Choe et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,564,238 B1 * | 5/2003 | Kim et al. .................... 708/513 |
| 6,571,268 B1 | 5/2003 | Giacalone et al. |
| 6,573,749 B2 | 6/2003 | New et al. |
| 6,574,762 B1 | 6/2003 | Karimi et al. |
| 6,578,060 B2 | 6/2003 | Chen et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,806,733 B1 | 10/2004 | Pan et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,915,322 B2 | 7/2005 | Hong |
| 6,917,955 B1 | 7/2005 | Botchev |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,024,446 B2 | 4/2006 | Langhammer et al. |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,200,631 B2 | 4/2007 | Mailaender et al. |
| 7,230,451 B1 | 6/2007 | Langhammer |
| 7,313,585 B2 | 12/2007 | Winterrowd |
| 7,343,388 B1 | 3/2008 | Burney et al. |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown et al. |
| 7,650,374 B1 | 1/2010 | Gura et al. |
| 7,668,896 B2 | 2/2010 | Lutz et al. |
| 7,719,446 B2 | 5/2010 | Rosenthal et al. |
| 7,720,898 B2 | 5/2010 | Driker et al. |
| 7,769,797 B2 | 8/2010 | Cho et al. |
| 7,814,136 B1 | 10/2010 | Verma et al. |
| 7,814,137 B1 | 10/2010 | Mauer |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,917,567 B1 | 3/2011 | Mason et al. |
| 7,930,335 B2 | 4/2011 | Gura |
| 7,930,336 B2 | 4/2011 | Langhammer |
| 7,949,699 B1 | 5/2011 | Neoh et al. |
| 7,974,997 B2 | 7/2011 | Arviv et al. |
| 8,024,394 B2 | 9/2011 | Prokopenko et al. |
| 8,041,759 B1 | 10/2011 | Langhammer et al. |
| 8,090,758 B1 | 1/2012 | Shimanek et al. |
| 8,112,466 B2 | 2/2012 | Minz et al. |
| 8,301,681 B1 | 10/2012 | Lee et al. |

(56) References Cited

U.S. PATENT DOCUMENTS

| | | | |
|---|---|---|---|
| 8,307,023 B1 | 11/2012 | Leung et al. | |
| 8,386,550 B1 | 2/2013 | Mauer et al. | |
| 8,386,553 B1 | 2/2013 | Langhammer et al. | |
| 8,396,914 B1 | 3/2013 | Langhammer | |
| 8,447,800 B2 | 5/2013 | Dockser et al. | |
| 8,463,835 B1 | 6/2013 | Walke | |
| 8,468,191 B2 * | 6/2013 | Mantor et al. | 708/513 |
| 8,595,279 B2 * | 11/2013 | Dockser | 708/513 |
| 8,706,790 B1 * | 4/2014 | Langhammer | 708/513 |
| 8,751,551 B2 | 6/2014 | Streicher et al. | |
| 2001/0023425 A1 | 9/2001 | Oberman et al. | |
| 2001/0029515 A1 | 10/2001 | Mirsky | |
| 2001/0037351 A1 | 11/2001 | Hellberg | |
| 2001/0037352 A1 | 11/2001 | Hong | |
| 2002/0002573 A1 | 1/2002 | Landers et al. | |
| 2002/0032713 A1 | 3/2002 | Jou et al. | |
| 2002/0038324 A1 | 3/2002 | Page et al. | |
| 2002/0049798 A1 | 4/2002 | Wang et al. | |
| 2002/0078114 A1 | 6/2002 | Wang et al. | |
| 2002/0089348 A1 | 7/2002 | Langhammer | |
| 2002/0116434 A1 | 8/2002 | Nancekievill | |
| 2002/0129073 A1 | 9/2002 | Page et al. | |
| 2002/0143841 A1 | 10/2002 | Farooqui et al. | |
| 2003/0065699 A1 | 4/2003 | Burns | |
| 2003/0088757 A1 | 5/2003 | Lindner et al. | |
| 2004/0064770 A1 | 4/2004 | Xin | |
| 2004/0083412 A1 | 4/2004 | Corbin et al. | |
| 2004/0103133 A1 | 5/2004 | Gurney | |
| 2004/0122882 A1 | 6/2004 | Zakharov et al. | |
| 2004/0148321 A1 | 7/2004 | Guevorkian et al. | |
| 2004/0172439 A1 | 9/2004 | Lin | |
| 2004/0178818 A1 | 9/2004 | Crotty et al. | |
| 2004/0193981 A1 | 9/2004 | Clark et al. | |
| 2004/0267857 A1 | 12/2004 | Abel et al. | |
| 2004/0267863 A1 | 12/2004 | Bhushan et al. | |
| 2005/0038842 A1 | 2/2005 | Stoye | |
| 2005/0120122 A1 | 6/2005 | Farnham | |
| 2005/0144212 A1 | 6/2005 | Simkins et al. | |
| 2005/0144215 A1 | 6/2005 | Simkins et al. | |
| 2005/0144216 A1 | 6/2005 | Simkins et al. | |
| 2005/0166038 A1 | 7/2005 | Wang et al. | |
| 2005/0187997 A1 | 8/2005 | Zheng et al. | |
| 2005/0187999 A1 | 8/2005 | Zheng et al. | |
| 2005/0262175 A1 | 11/2005 | Iino et al. | |
| 2006/0020655 A1 | 1/2006 | Lin | |
| 2006/0059215 A1 | 3/2006 | Maharatna et al. | |
| 2006/0112160 A1 | 5/2006 | Ishii et al. | |
| 2007/0083585 A1 | 4/2007 | St. Denis et al. | |
| 2007/0124352 A1 | 5/2007 | Wittig | |
| 2007/0185951 A1 | 8/2007 | Lee et al. | |
| 2007/0185952 A1 | 8/2007 | Langhammer et al. | |
| 2007/0226287 A1 | 9/2007 | Lin et al. | |
| 2007/0241773 A1 | 10/2007 | Hutchings et al. | |
| 2008/0133627 A1 | 6/2008 | Langhammer et al. | |
| 2008/0159441 A1 | 7/2008 | Liao et al. | |
| 2008/0183783 A1 | 7/2008 | Tubbs | |
| 2009/0028455 A1 | 1/2009 | Nakamura et al. | |
| 2009/0083358 A1 | 3/2009 | Allen | |
| 2009/0113186 A1 | 4/2009 | Kato et al. | |
| 2009/0172052 A1 | 7/2009 | DeLaquil et al. | |
| 2009/0182795 A1 | 7/2009 | Dobbek et al. | |
| 2009/0187615 A1 | 7/2009 | Abe et al. | |
| 2009/0228689 A1 | 9/2009 | Muff et al. | |
| 2009/0292750 A1 | 11/2009 | Reyzin et al. | |
| 2009/0300088 A1 | 12/2009 | Michaels et al. | |
| 2009/0300323 A1 | 12/2009 | Hessel et al. | |
| 2010/0098189 A1 | 4/2010 | Oketani | |
| 2010/0146022 A1 | 6/2010 | Swartzlander et al. | |
| 2010/0191939 A1 | 7/2010 | Muff et al. | |
| 2011/0106868 A1 | 5/2011 | Lutz | |
| 2011/0137970 A1 | 6/2011 | Dockser et al. | |
| 2011/0161389 A1 | 6/2011 | Langhammer et al. | |
| 2011/0219052 A1 | 9/2011 | Langhammer | |
| 2011/0238720 A1 | 9/2011 | Langhammer | |
| 2011/0320513 A1 | 12/2011 | Langhammer | |
| 2012/0054254 A1 | 3/2012 | Langhammer | |
| 2012/0054256 A1 | 3/2012 | Langhammer | |
| 2012/0113133 A1 | 5/2012 | Shpigelblat | |
| 2012/0166512 A1 | 6/2012 | Wong et al. | |
| 2012/0191967 A1 | 7/2012 | Lin et al. | |
| 2012/0290819 A1 | 11/2012 | Langhammer | |
| 2013/0138711 A1 | 5/2013 | Sugisawa | |
| 2014/0067895 A1 | 3/2014 | Wang | |
| 2014/0089371 A1 | 3/2014 | De Dinechin et al. | |

FOREIGN PATENT DOCUMENTS

| | | |
|---|---|---|
| EP | 0 380 456 | 8/1990 |
| EP | 0 411 491 | 2/1991 |
| EP | 0 419 105 | 3/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 049 025 | 11/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO 2005/101190 | 10/2005 |
| WO | WO 2010/102007 | 9/2010 |

OTHER PUBLICATIONS

Altera Corporation, "Statix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook* vol. 2, Chapter 6, v4.0 (Oct. 2005).

Altera Corporation, "FIR Compiler: MegaCore® Function User Guide," version 3.3.0, rev. 1, pp. 3-11 through 3-15 (Oct. 2005).

Altera Corporation, "Advanced Synthesis Cookbook: A Design Guide for Stratix II, Stratix III and Stratix IV Devices," Document Version 3.0, 112 pgs., May 2008.

Amos, D., "PLD architectures match DSP algorithms" *Electronic Product Design*, vol. 17, No. 7, Jul. 1996, pp. 30, 32.

(56) References Cited

OTHER PUBLICATIONS

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science vol. 1896)* Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal* vol. 31, No. 3, 2000, pp. 161-168.

Berg, B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, P., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

deDinechin, F. et al., "Large multipliers with less DSP blocks," retrieved from http://hal-ens-lyon.archives-ouvertes.fr/ensl-00356421/en/, 9 pgs., available online Jan. 2009.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.

Farooqui, A., et al., "General Data-Path Organization of a MAC unit for VLSI Implementation of DSP Processors," *ISCAS '98, Part 2*, May 31, 1998-Jun. 3, 1998, pp. 260-263.

Fujioka, Y., et al., "240MOPS Reconfigurable Parallel VLSI Processor for Robot Control," *Proceedings of the 1992 International Conference on Industrial Electronics, Control, Instrumentation, and Automation: Signal Processing and Systems Control; Intelligent Sensors and Instrumentation*, vol. 3, pp. 1385-1390, Nov. 9-13, 1992.

Gaffer, A.A., et al., "Floating-Point Bitwidth Analysis via Automatic Differentiation," *IEEE Conference on Field Programmable Technology*, Hong Kong, Dec. 2002.

Govindu, G. et al., "A Library of Parameterizable Floating-Point Cores for FPGAs and Their Application to Scientific Computing," *Proc Int'l Conf. Eng. Reconfigurable Systems and Algorithms (ERSA '05)*, Jun. 2005.

Govindu, G. et al., "Analysis of High-performance Floating-point Arithmetic on FPGAs," *Proceedings of the 18th International Parallel and Distributed Processing Symposium (PDPS'04)* pp. 149-156, Apr. 2004.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems " *Keynote Address, 5th Canadian Conference on Field Programmable Devices*, Jun. 1998, http:--www.ee.washington.edu-people-faculty-hauck-publications-ReconfigFuture.PDF.

Haynes, S.D., et al., "Configurable multiplier blocks for embedding in FPGAs," *Electronicas Letters*, vol. 34, No. 7, pp. 638-639 (Apr. 2, 1998).

Heysters, P.M., et al., "Mapping of DSP algorithms on field programmable function arrays," *Field-Programmable Logic and Applications. Roadmap to Reconfigurable Computing. 10th International Conference, FPL 2000 Proceedings (Lecture Notes in Computer Science vol. 1896)* Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA® FPGA Express™ Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings (IEEE Cat. No. 96TH8140)*, Oct. 21-24, 1996, pp. 275-279.

Jones, G., "Field-programmable digital signal conditioning," *Electronic Product Design*, vol. 21, No. 6, Jun. 2000, pp. C36-C38.

Karlstrom, K., et al., "High Performance, Low Latency FPGA based Floating Point Adder and Multiplier Units in a Virtex 4," Norchip Conf., pp. 31-34, 2006.

Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Kramberger, I., "DSP acceleration using a reconfigurable FPGA" *ISIE '99. Proceedings of the IEEE International Symposium on Industrial Electronics (Cat. No. 99TH8465)* vol. 3, Jul. 12-16, 1999, pp. 1522-1525.

Langhammer, M., "How to implement DSP in Programmable Logic," *Elettronica Oqqi*, No. 266, Dec. 1998, pp. 113-115.

Langhammer, M., "Implementing a DSP in Programmable Logic " *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Martinson, L. et al., "Digital matched Filtering with Pipelined Floating Point Fast Fourier Transforms (FFT's)," *IEEE Transactions on Acoustics, Speech, and Signal Processing*, vol. ASSP-23, No. 2, pp. 222-234, Apr. 1975.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

(56) References Cited

OTHER PUBLICATIONS

Nakasato, N., et al., "Acceleration of Hydrosynamical Simulations using a FPGA board", *The Institute of Electronics Information and Communication Technical Report CPSY2005-47*, vol. 105, No. 515, Jan. 17, 2006.

Nedjah, N., et al., "Fast Less Recursive Hardware for Large Number Multiplication Using Karatsuba-Ofman's Algorithm" *Computer and Information Sciences—ISCIS*, pp. 43-50, 2003.

Nozal, L., et al., "A new vision system: programmable logic devices and digital signal processor architecture (PLD+FDSP)," *Proceedings IECON '91. 1991 International Conference on Industrial Electronics, Control and Instrumentation (Cat. No. 91CH2976-9)* vol. 3, Oct. 28-Nov. 1, 1991, pp. 2014-2018.

Osana, Y., et al., "Hardware-resource Utilization Analysis on an FPGA-Based Biochemical Simulator ReCSiP" *The Institute of Electronics Information and Communication Technical Report CPSY2005-63*, vol. 105, No. 516, Jan. 18, 2006.

Papenfuss, J.R, et al., "Implementation of a real-time, frequency selective, RF channel simulator using a hybrid DSP-FPGA architecture " *RAWCON 2000: 2000 IEEE Radio and Wireless Conference (Cat. No. 00EX404)*, Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)* vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications (Cat. No. 99EX303)*, Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Thapliyal, H., et al., "Combined Integer and Floating Point Multiplication Architecture (CIFM) for FPGSs and Its Reversible Logic Implementation", *Proceedings MWSCAS 2006*, Puerto Rico, 5 pages, Aug. 2006.

Thapliyal, H., et al., "Combined Integer and Variable Precision (CIVP) Floating Point Multiplication Architecture for FPGAs", *Proceedings of the 2007 International Conference on Parallel and Distributed Processing Techniques and Applications (PDPTA '07)* Las Vegas, US, vol. 1, pp. 449-450, Jun. 2007.

Tisserand, A., et al., "An on-line arithmetic based FPGA for low power custom computing," *Field Programmable Logic and Applications, 9th International Workshop, FPL '99, Proceedings (Lecture Notes in Computer Science vol. 1673)*, Lysaght, P., et al., eds., Aug. 30-Sep. 1, 1999, pp. 264-273.

Tralka, C., "Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Vladimirova, T. et al., "Floating-Point Mathematical Co-Processor for a Single-Chip On-Board Computer," *MAPLD '03 Conference, D5*, Sep. 2003.

Wajih, E.-H.Y. et al., "Efficient Hardware Architecture of Recursive Karatsuba-Ofman Multiplier," *$3^{rd}$ International Conference on Design and Technology of Integrated Systems in Nanoscale Era*, 6 pgs, Mar. 2008.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., " XtremeDSP Design Considerations User Guide," v 1.2, Feb. 4, 2005.

Xilinx Inc., "Complex Multiplier v2.0", DS291 Product Specification/Datasheet, Nov. 2004.

Xilinx, Inc., "Virtex-5 ExtremeDSP Design Considerations," *User Guide UG193*, v2.6, 114 pages, Oct. 2007.

Xilinx, Inc., "Implementing Barrel Shifters Using Multipliers", p. 1-4, Aug. 17, 2004.

Zhou, G. et al., "Efficient and High-Throughput Implementations of AES-GCM on FPGAs," *International Conference on Field-Programmable Technology*, 8 pgs., Dec. 2007.

\* cited by examiner

MULTIPLE-PRECISION PROCESSING BLOCK IN A PROGRAMMABLE INTEGRATED CIRCUIT DEVICE

BACKGROUND OF THE INVENTION

This invention relates to specialized processing block for a programmable integrated circuit device such as, e.g., a programmable logic device (PLD), which can be configured for different levels of arithmetic precision.

As applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® family, include DSP blocks, each of which may include four 18-by-18 multipliers. Each of those DSP blocks also may include adders and registers, as well as programmable connectors (e.g., multiplexers) that allow the various components to be configured in different ways. In each such block, the multipliers can be configured not only as four individual 18-by-18 multipliers, but also as four smaller multipliers, or as one larger (36-by-36) multiplier. In addition, one 18-by-18 complex multiplication (which decomposes into two 18-by-18 multiplication operations for each of the real and imaginary parts) can be performed.

Such processing blocks have heretofore supported single-precision floating-point arithmetic operations (e.g., according to the IEEE754-1985 standard for floating-point arithmetic operations). Users who required higher levels of precision (the IEEE754-1985 standard provides for double-precision and quadruple-precision operations) have been required to configure higher-precision operations using general-purpose programmable resources of the programmable devices, possibly in conjunction with the single-precision processing blocks.

SUMMARY OF THE INVENTION

The present invention conserves resources on a programmable integrated circuit device by providing specialized processing blocks that can be configured for double-precision arithmetic operations but also can be partitioned for configuration as two single-precision arithmetic operations. For example, a 54-by-54 multiplication would be sufficient for multiplication of the 52-bit mantissas of two double-precision numbers, but also could be partitioned into two 27-by-27 multiplications, each of which could be used for multiplication of the 23-bit mantissas of a respective pair of single-precision numbers. The specialized processing block would also include adders that are decomposable or fracturable so that they can be used for a single larger operation such as a double-precision floating-point operation, or two smaller operations such as single-precision floating-point operations. Those adders could include components such as shifters, count-leading-zeroes units, and "sticky bit" calculators, that also would be decomposable or fracturable so that the adder could be decomposed. Other components, such as those used for exponent handling, are simple enough, and small enough, to simply be replicated.

Therefore, in accordance with the present invention, there is provided a specialized processing block for performing floating-point arithmetic operations at selectable different precisions in a programmable integrated circuit device. The specialized processing block includes a plurality of different respective types of floating-point arithmetic operator structures. For each respective type of floating-point arithmetic operator structure, respective control circuitry is provided for partitioning the respective type of floating-point arithmetic operator structure to select between a first precision for which the respective type of floating-point arithmetic operator structure is not partitioned, and at least a second precision, less than the first precision, for which the respective type of floating-point arithmetic operator structure is partitioned into at least two smaller ones of the respective type of floating-point arithmetic operator structure.

A method for configuring such a programmable device, and a machine-readable data storage medium encoded with software for performing the method, are also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

A specialized processing block as disclosed herein can efficiently support both single- and double-precision floating-point arithmetic, as well as the capability to support single-extended-precision floating-point arithmetic.

As compared to supporting single-precision floating-point operations, supporting double-precision floating-point operations requires twice the interface width—single-precision floating-point operations use a 32-bit representation while double-precision floating-point operations use a 64-bit representation—but about four times the logic. Most of the increase in logic will likely fall in the mantissa multipliers, where single-precision floating-point operations require a 24-by-24 multiplication and double-precision floating-point operations require a 53-by-53 multiplication. In addition, the increased logic depth (e.g., in partial product compression) and width (e.g., in the final carry-propagate adder) may result in a 20%-30% delay increase in a double-precision floating-point multiplier as compared to a single-precision floating-point multiplier.

In addition, the specialized processing block may contain at least one adder per multiplier—e.g., to support common digital signal processing tasks. Therefore a specialized processing block that supports multiple precisions also should support single-precision floating-point addition and double-precision floating-point addition. And as specified above, those adders also could include other circuits such as shifters, count-leading-zeroes units, and "sticky bit" calculators, that can be decomposed to support either the single larger addition operation, or two smaller addition operations.

For most DSP algorithms, there is at least one adder per multiplier. Therefore a processing block that supports at least one multiplier and one adder, or a number of multipliers with at least the same number of adders, would be preferred.

Figure 1:
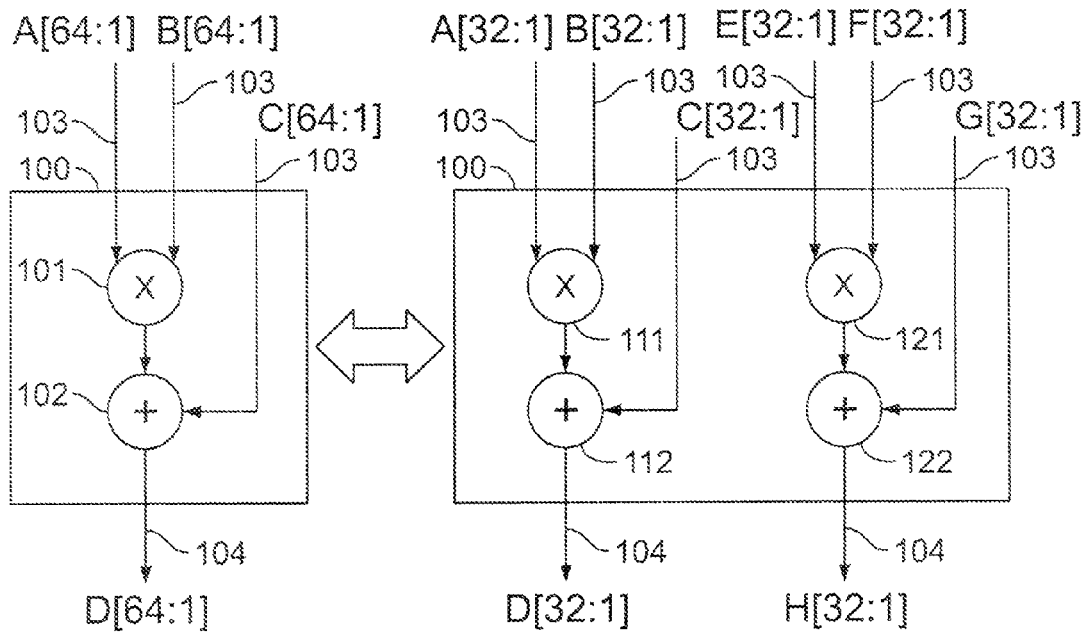
FIG. 1 is a high-level schematic representation of a specialized processing block that can be configured as one multiplier/adder pair of a first precision, or two multiplier/adder pairs of a second precision.

FIG. 1 shows schematically, at a high level, an example of how a specialized processing block 100 can support one double-precision multiplier/adder pair 101/102, or two single-precision, or single-extended-precision, multiplier/adder pairs 111/112 and 121/122 partitioned from multiplier/adder pair 101/102. However, it will be understood that block 100 may be arbitrarily large, and therefore may support additional double-precision multiplier/adder pairs, each of which can be partitioned into two single-precision, or single-extended-precision, multiplier/adder pairs. The particular multiplier and adder structures are not important—any structure that can be partitioned can be included in a specialized processing block according to the invention, but examples of multiplier and adder structures (including auxiliary structures such as shifters and count-leading-zeroes structures), that can be partitioned in accordance with embodiments of the invention, are shown below.

Specialized processing block 100 also includes sufficient input/output ("I/O") resources to support both the double-precision multiplier/adder pair or pairs and the larger number of decomposed single-precision or single-extended-precision multiplier/adder pairs. In double-precision mode, multiplier/adder pair 101/102 consumes 192 (3×64) input wires 103 and 64 output wires 104. In single-precision mode 110, the block also requires 192 (6×32) input wires 103 and 64 (2×32) output wires 104. The number of wires required for the single-extended-precision mode (not shown) is larger. The precision of a single-extended-precision number is not fixed in the IEEE754-1985 standard, but rather it is just stated as being larger than single precision (and smaller than double-precision). One possible size is a sign bit, a 32-bit mantissa and an 11-bit exponent, for a total of 44 bits. Using those parameters, the number of wires required for two single-extended-precision multiplier/adder pairs would be, 264 (6×44) input wires and 88 (2×44) output wires.

Copending, commonly-assigned U.S. patent application Ser. No. 13/677,924, filed Nov. 15, 2012 and hereby incorporated by reference herein in its entirety, discloses a multiplier structure including six 18-by-18 multipliers that could efficiently switch between one 54-by-54 multiplication and two 36-by-36 multiplications with almost no logic overhead. Each 36-by-36 multiplication is implemented using a binary Karatsuba decomposition, so that three 18-by-18 multipliers are used instead of four 18-by-18 multipliers. Similarly, the 54-by-54 multiplication is implemented using a ternary Karatsuba decomposition so that six 18-by-18 multipliers are used instead of eight 18-by-18 multipliers.

The multiplier architecture disclosed in above-incorporated application Ser. No. 13/677,924 is structured so that most of the partial product alignments (the outputs of the 18-by-18 multipliers) are common between the 54-by-54 multiplication and the two independent 36-by-36 multiplications. Although the 36-by-36 multipliers are larger than the 24-by-24 multipliers required for single precision mantissa multiplications, the 36-by-36 multipliers can be used to provide mantissa multiplications for both single-precision and single-extended-precision floating-point multiplications.

Such a multiplier architecture can be used in a specialized processing block according to the present invention to provide the multiplier portion that will support single-precision, single-extended precision, and double-precision arithmetic operations. However, it will be appreciated that any architecture that can be configured as both one 54-by-54 multiplication and two independent smaller multiplications, whether formed from six 18-by-18 multipliers using Karatsuba decomposition as described above, or using eight 18-by-18 multipliers in a more conventional arrangement, or by using any other multiplication arrangement, can be used as part of a specialized processing block to provide single-precision, single-extended-precision, and double-precision floating-point arithmetic operations according to embodiments of the present invention, such as, without limitation, in the examples below.

Figure 2:
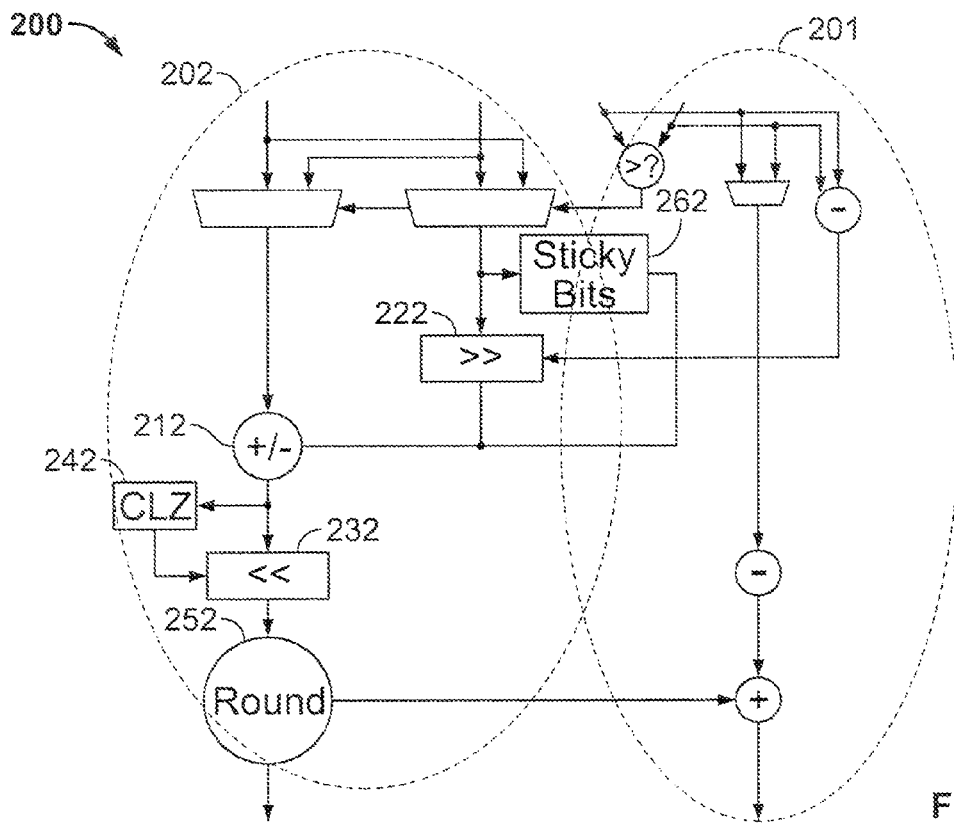
FIG. 2 is a schematic representation of a generic floating-point adder structure.

FIG. 2 shows a generic floating-point adder 200, including exponent-handling portion 201 and mantissa-handling portion 202. The sign can be handled by mantissa-handling portion 202. Components of exponent-handling portion 201 are relatively small and inexpensive, and therefore exponent-handling portion 201 can be replicated as many times as are necessary to support the different modes of operation of the specialized processing block. Mantissa-handling portion 202 includes fixed-point adder 212, shifters 222, 232, count-leading-zeroes module 242, rounding module 252 and sticky bit module 262. Each of these components is relatively large and expensive and, in accordance with the present invention, can be constructed to make it relatively easy to split in two for the single-precision and single-extended-precision modes. Examples of way to perform such splitting are described below.

Multiple fracturable mantissa adders may be required, depending on the particular floating-point adder topology. For example, for a single path adder, a mantissa adder would be located before count-leading-zeroes module 242 and left-shifter 232, followed by a rounding adder before the output. On the other hand, for a dual-path structure, the far path can have rounding combined with the mantissa adder—e.g., using known flagged prefix tree structures. The near path would only have a mantissa adder (or likely a subtractor), and would not require a separate rounding structure.

The exact structure of the decomposition of the single larger structure used for double-precision operations into the two smaller structures used for single-precision and single-extended-precision operations is not important, and can be implemented in different ways. However, the decomposition points do need to be chosen in a way that supports all three different floating-point precision levels, as discussed below in connection with the different fracturable components.

Figure 3:
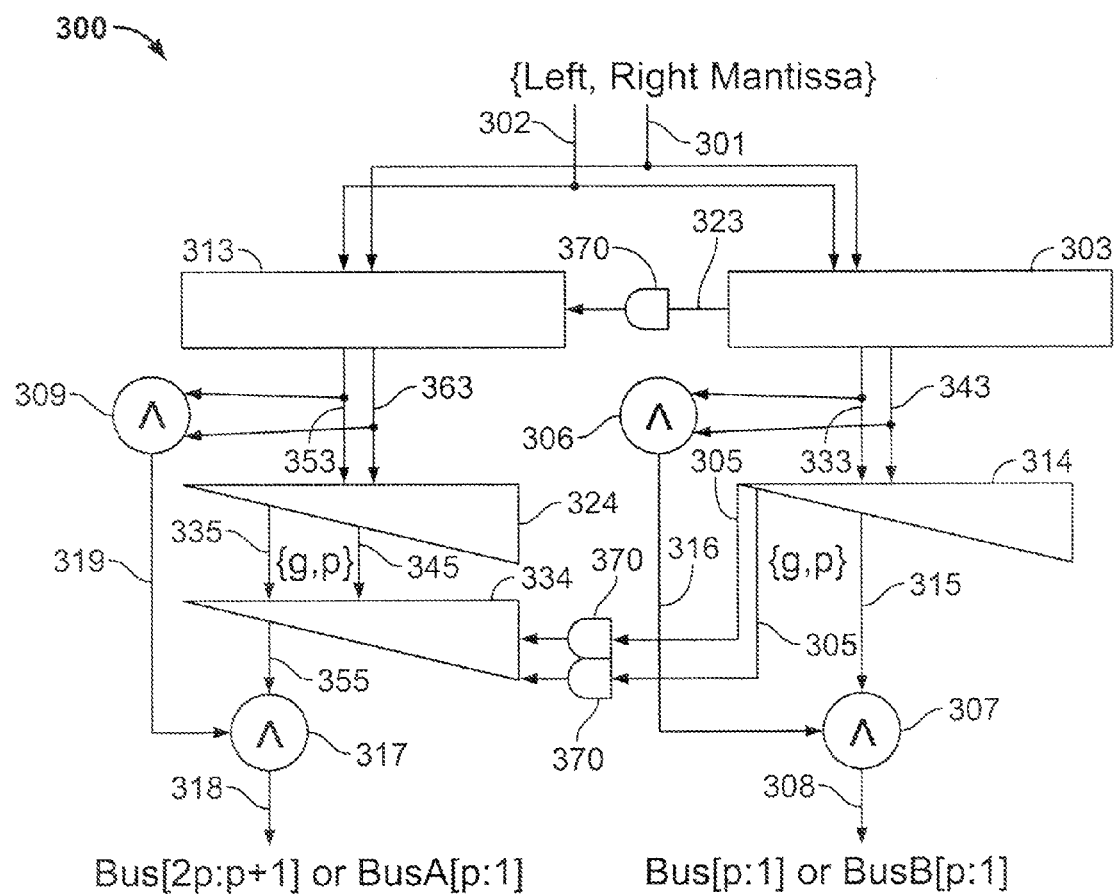
FIG. 3 is a schematic representation of a fracturable fixed-point adder structure that can be used for the mantissa and rounding portion of a floating-point adder partitioned in accordance with embodiments of the present invention.

One possible adder structure 300 for the fixed-point mantissa adder 212 is shown in FIG. 3 and is similar to an adder shown in copending, commonly-assigned U.S. patent application Ser. No. 13/486,255, which is hereby incorporated by reference herein in its entirety.

In the double-precision case, the upper and lower halves, respectively, of each mantissa 301, 302 to be added, are input to respective half-adders 303, 313. Each half-adder provides two vector outputs, which may be referred to as a half-add-sum and half-add-carry. The half-add-sum vector is the result of the bitwise XOR of the respective input vectors (discarding the most significant bit). The half-add-carry vector is the result of a 1-bit left-shift of the bitwise AND of the input vectors, with a '0' inserted in its least-significant bit position (the most significant bit is used as carry information 323 from adder 303 to adder 313).

Respective half-adder output vectors 333, 343 and 353, 363 are input to a parallel prefix network tree 304, which may include three prefix networks 314, 324, 334. Each prefix network may be, for example, a Kogge-Stone prefix network, which outputs respective generate and propagate vectors.

The lower vectors 333, 343 are input to prefix network 314 to provide generate vector 315. The upper vectors 353, 363 are input to prefix network 324 to provide generate and propagate vectors 335, 345. Vectors 335, 345 are input to prefix network 334 along with the prefix(g,p) output 305 of the highest node of network 314. Network 334 outputs generate vector 355.

In order to provide lower and upper sum output halves 308, 318, bits of half-add vectors 333, 343 are XORed at 306 to provide vector 316, bits of which are then XORed at 307 with bits of generate vector 315 to provide sum 308. Similarly, bits of half-add vectors 353, 363 are XORed at 309 to provide vector 319, bits of which are then XORed at 329 with bits of generate vector 355 to provide sum 318. Sums 308 and 318 are the lower and upper portions of the combined sum for the double-precision case, and are the separate sums for the single-precision or single-extended-precision cases. In the single-precision and single-extended-precision cases, AND-gates 370 disconnect the two halves.

Figure 4:
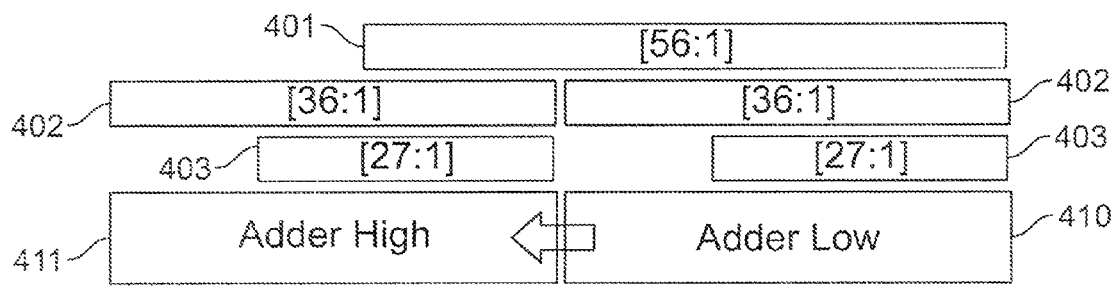
FIG. 4 is a schematic representation of possible alignments of different inputs to the structure of FIG. 3 in different modes of operation.

As noted above, there are different ways to select the decomposition points. In one case, the larger adder can be decomposed into two equal smaller adders. The two adder halves perform the single-precision or single-extended-precision additions, with each adder half being as wide as one single-extended-precision mantissa (if single-extended-precision operations are not to be supported, each adder half can be as wide as one single-precision mantissa). As seen in FIG. 4, in this case, in double-precision operation, the double-precision mantissa 401 is aligned to the least significant bit of the lower adder 410. Similarly in this case, each respective single-extended-precision mantissa 402 or each respective single-precision mantissa 403 is aligned to the least significant bit of the respective lower and upper adder halves 410, 411 (e.g., using a single-precision-width multiplexer, not shown). When single-precision mantissas are added, the upper input bits to the adders (between the MSB of each single precision mantissa and the MSB of the respective adder) can be zeroed to reduce power consumption.

The exact mantissa precisions required for the different floating-point number formats will depend on factors such as whether rounding is combined with the mantissa addition. In some cases, such as when rounding and/or far-path normalization are combined with the mantissa addition, some number of less significant bits (typically two bits) will not be part of the addition, but will used to calculate a carry-in bit to the adder. In such a case, each of the precisions in FIG. 4 can be reduced by two bits.

In general, the respective mantissas preferably would be aligned the least-significant bits of the respective adders. For example, if there are two 36-bit adders (to support two single-extended-precision mantissa additions), each of the smaller 26-bit mantissa additions for single-precision operations would start at the least-significant bit of the respective adder. That way the timing for the single-precision additions can be determined at the 26th bit rather than at the 36th bit, which will improve performance. The same would be the case even where the decomposition points were selected so that the smaller additions were not of equal sizes, although clearly neither could exceed the size of the portions of the fractured adder.

Figure 5:
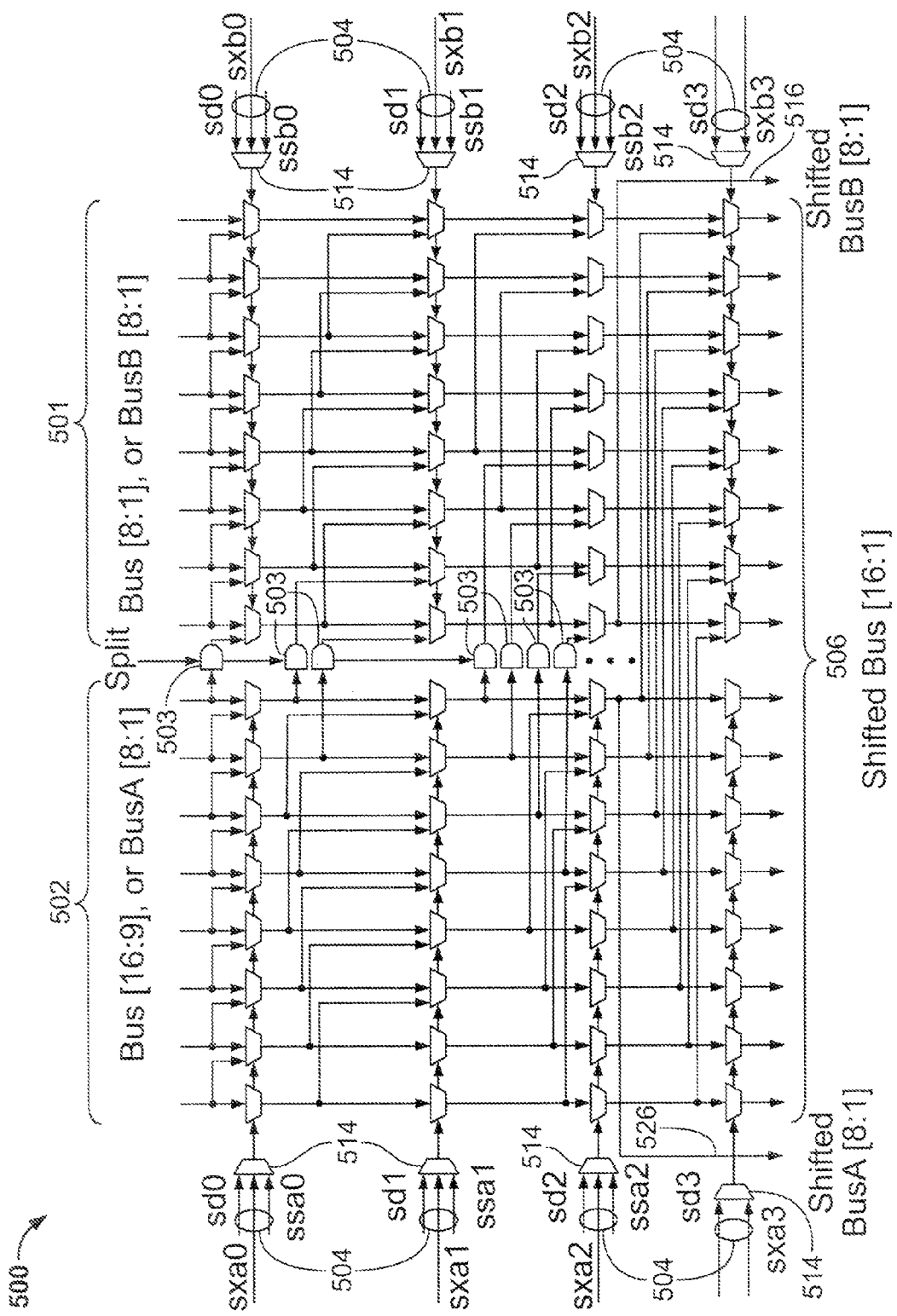
FIG. 5 is a schematic representation of a shifter structure that can be partitioned in accordance with embodiments of the present invention.

One possible right-shifter structure 500 for the right-shifter 222 is shown in FIG. 5. Although this example is for a right-shifter, the structure translates to a left shift as well. And while the example shows a binary shift (each level shifts the input twice as many bits as the previous level), the structure translates to a shift having any other radix.

As in the case of adder 300, the example shifter 500 is divisible exactly in half, but other divisions can be used as discussed below. The lower and upper halves 501, 502 can be used for the lower and upper bits of a double-precision number, or for separate respective single-precision or single-extended-precision numbers.

A set of AND-gates 503, controlled by the signal "split," is used to prevent signals from crossing the boundary of the two halves in the single-precision or single-extended-precision case. In order to accommodate the single-precision or single-extended-precision case, the shifting control inputs 504, which control the magnitude of the shift, are chained only as far as the boundary 503. Therefore, in the double-precision case, the shifting control inputs $sd_n$ (in this example, n=0 . . . 3) need to be entered from both sides. Control input multiplexers 514 select from among the double-precision control inputs $sd_n$, the single-precision control inputs $ssa_n$ or $ssb_n$, or the single-extended-precision control inputs $sxa_n$ or $sxb_n$. The double-precision output is represented by bits 506, which also are used for the single-extended-precision case. The output is taken at the third level, as shown at 516, 526, for the single-precision case. Alternatively, the single-precision output also can be taken at 506. This alternative may be slower because of the additional delay through the last level of logic; however, it also will require less routing ($sd_3$ will be 0 in this case, so no shifting will occur).

If single-extended precision is not to be supported in a particular embodiment, and shifts are not going to cross a radix boundary, gates 503 can be omitted from the last level of shifter structure 500, as shown, and multiplexers 514 also can be omitted for that level. Moreover, an optional connection (not shown) can be provided between the upper and lower halves of that level, in which case $sd_n$ can be applied from one side only.

For clarity, the shift size is shown for a 16-bit mantissa, decomposable to two 8-bit mantissas. However, for double-precision operations, which have a 53-bit mantissa, six levels of binary shift would be needed, with the output taken at the fifth level for single-precision operations (with a 24-bit mantissa). For single-extended-precision operations, where the mantissa size typically may be between 32 bits and 36 bits, the output likely will be taken at the sixth level, unless the mantissa size is at or below 32 bits.

For other radices, number of shift levels would be ceil($\log_{RADIX}$(MANTISSA_SIZE)), with the single-precision or single-extended-precision result taken at the (ceil($\log_{RADIX}$(MANTISSA_SIZE))−1)th level. For any mantissa size and radix, shifter 500 would include AND-gates 503 preventing mantissa boundary crossings, selectable shift control values 504, and different output levels, such as ceil($\log_{RADIX}$(MANTISSA_SIZE)) and (ceil($\log_{RADIX}$(MANTISSA_SIZE))−1), for different precisions.

In this example, the split between the shifters occurs on a radix boundary, in this case with shifts of 8 and 16. However, shift amounts that do not coincide with radix boundaries may be required and are supported. For example, for a lower shift of 10 bits and an upper shift of 6 bits, AND-gates 503 would be two bit positions to the left of the position shown in FIG. 5. In addition, if the shift crosses a radix boundary, then there will be a shift component in the last level regardless of precision, so AND-gates 503 would be required on all levels. (Optional extension of gates 503 to the last level is indicated in FIG. 5 by the dashed line extending downward from the lowermost depicted gates 503.)

Figure 6:
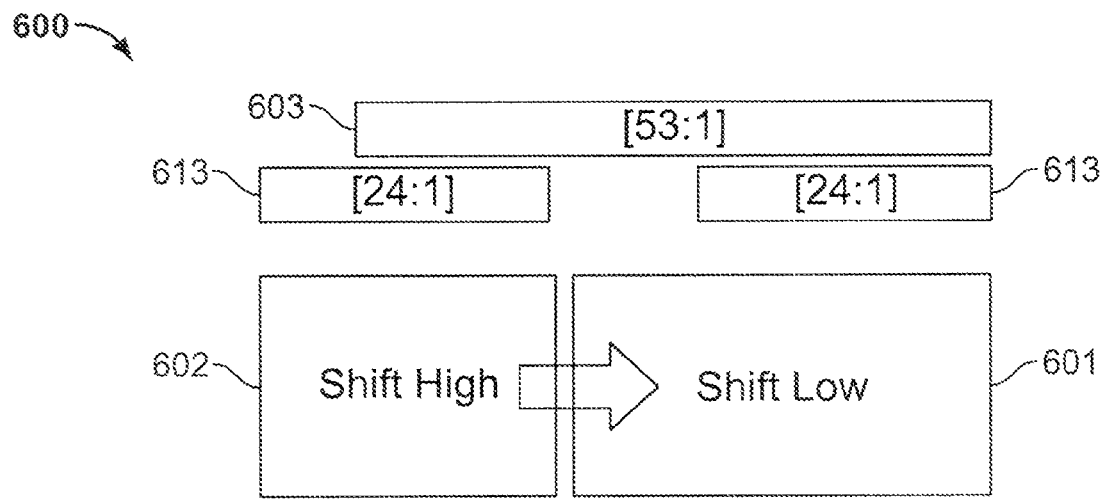
FIG. 6 is a first schematic representation of possible alignments of different inputs to the structure of FIG. 5 in different modes of operation.
Figure 7:
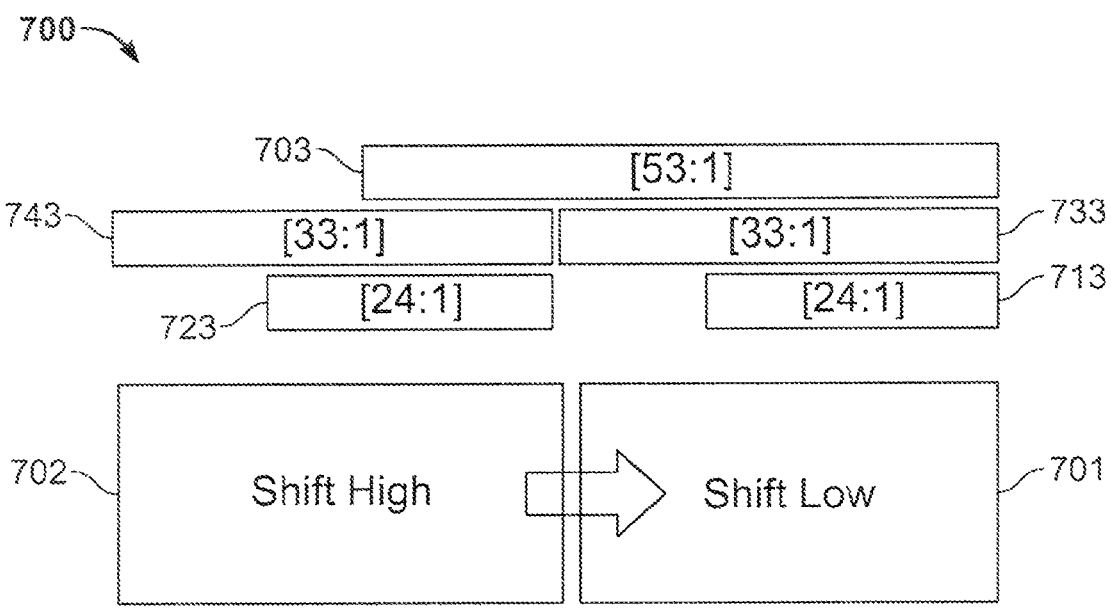
FIG. 7 is a second schematic representation of possible alignments of different inputs to the structure of FIG. 5 in different modes of operation.

Again, there are different ways to select the decomposition points. FIGS. 6 and 7 show different ways that shifter 500 can be used to support either two or three different mantissa sizes. In FIG. 7, shifter 500 is a 56 bit, six-level, radix 2 shifter, which is split into a lower 32-bit shifter 601 and an upper 24-bit shifter 602, supporting single-precision and double-precision operations. When double-precision addition is performed, the 53-bit mantissa 603 (52 bits and an implied leading '1') is aligned to the lower 53 bits of the shifter, and all the levels are used. When single-precision addition is performed, one of the 24-bit (23 bits and an implied leading '1') mantissas 613 is aligned to the 32-bit shifter 601, and the other 24-bit mantissa 623 is aligned to the 24 lower bits of the 24-bit shifter 602. "AND" gates 503 (FIG. 5) are used to separate the two shifters. The arrow between the high and low shifters 601, 602 represents the AND-gate structures 503 between the two halves, as shown in FIG. 5.

In a case where single-precision, single-extended-precision and double-precision operations are all supported, one possible shifter structure 700 is shown in FIG. 7. In this example, a 66-bit shifter (but with a maximum shift value of 53 bits, so only requiring 6 levels in the radix 2 case) is split into upper and lower 33-bit halves 701, 702. When double-precision addition is performed, the 53-bit mantissa 703 is aligned to the lower 53 bits of the shifter 700. When single-precision addition is performed, one of the 24-bit mantissas 713 is aligned to the 24 lower bits of the 33-bit shifter 701, and the other 24-bit mantissa 723 is aligned to the 24 lower bits of the 33-bit shifter 702. When single-extended-precision addition is performed with up to a 33-bit mantissa, each of the 33-bit mantissas 733, 743 is aligned to a respective one of 33-bit shifters 701, 702. If the mantissas 733, 743 are no more than 31 bits wide, shifters 701, 702 can be 32-bit shifters, which will align to a radix-2 boundary.

Figure 8:
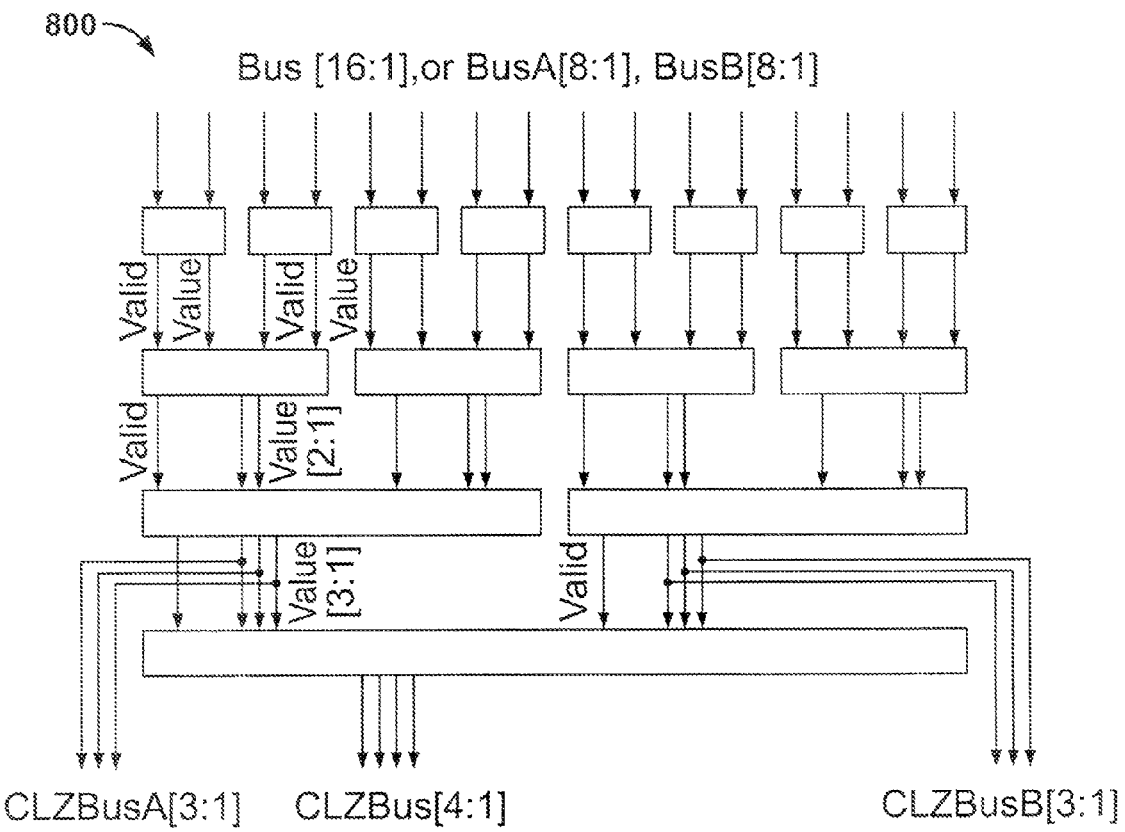
FIG. 8 is a schematic representation of a count-leading-zeroes structure that can be partitioned in accordance with embodiments of the present invention.

In connection with rounding, one possible count-leading-zeroes or CLZ (also known as leading-zeroes-detect or LZD) structure 800 for the CLZ module 242 is shown in FIG. 8. This example is a radix-2 structure, although a similar decomposition can be applied for other radices. The two bus halves can be split directly (without the need to use any separating gates such as those in the shifter 500). Counts for the smaller mantissas can be output directly from one of the earlier levels, just as with shifter 500.

If the smaller outputs are not directly subsets of the larger bus, care must be taken to align the input mantissas of the first level with the bus boundary, which is why the lower single-precision mantissa 904 (FIG. 9) is aligned with the most-significant bit of the lower half of CLZ structure 800. For example, the number of levels required for the radix-2 leading-zeroes count of a double-precision (53-bit) mantissa is six, with five levels needed for the single precision (24-bit) mantissa. A single-precision-wide multiplexer (not shown) may be required to align the lower single-precision mantissa 904 (FIG. 9) with the most-significant bit of the lower half of CLZ structure 800.

In structure 800, each block will output a "valid" signal when a '1' exists among its inputs, and if so also will output the number of zeroes in front of the '1'. Structure 800 is radix-2, which means that each level has half the number of blocks of the preceding level. Other radices, including mixed radices, can be used.

Figure 9:
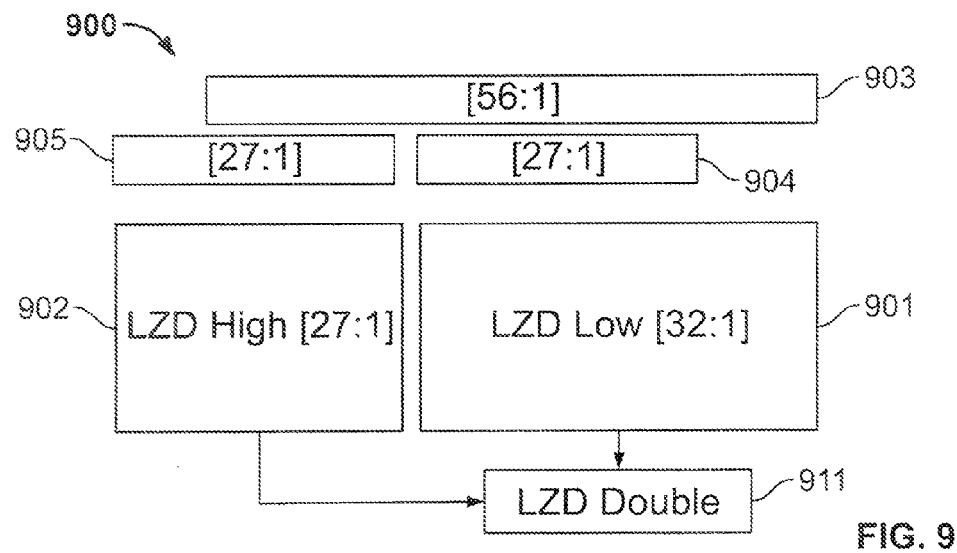
FIG. 9 is a first schematic representation of possible alignments of different inputs to the structure of FIG. 8 in different modes of operation.
Figure 10:
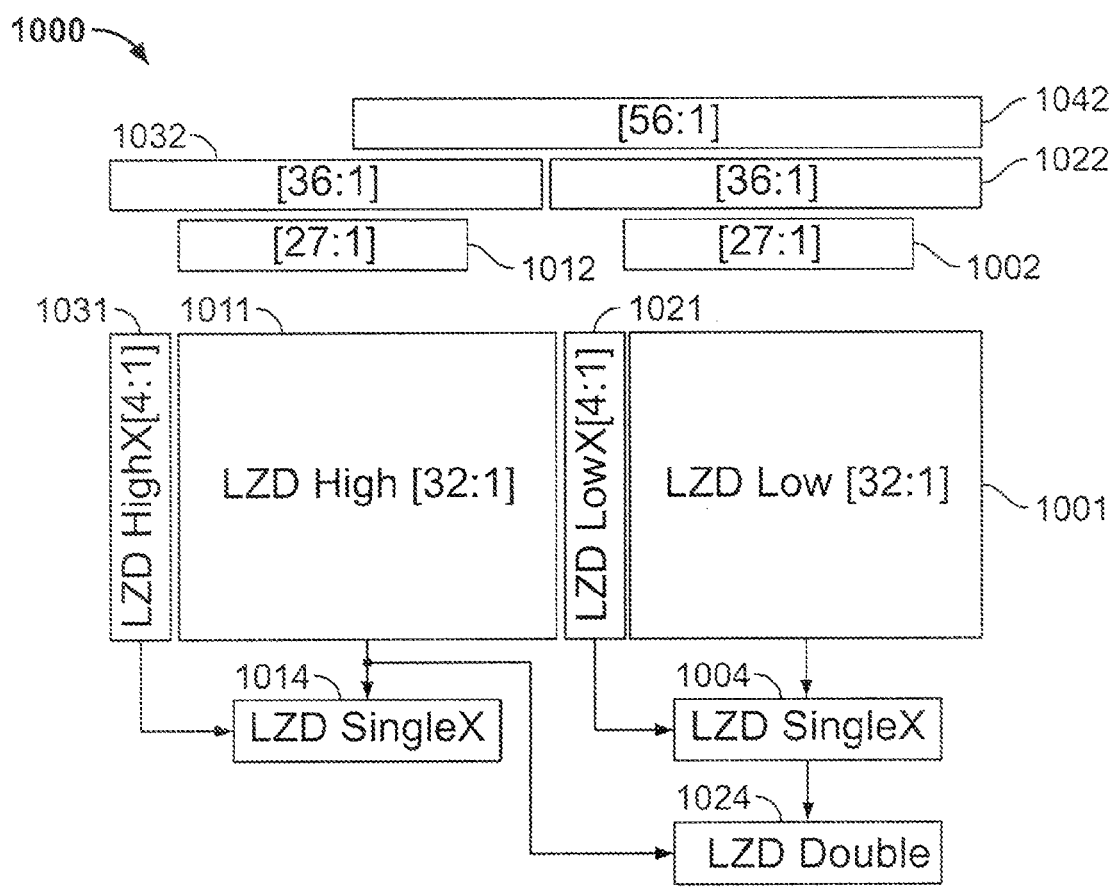
FIG. 10 is a second schematic representation of possible alignments of different inputs to the structure of FIG. 8 in different modes of operation.

Again, there are different ways to select the decomposition points. FIGS. 9 and 10 show different ways that structure 800 can be used to support either two or three different mantissa sizes. In FIG. 9, structure 900 supports both single-precision and double-precision leading zero detection. Structure 900 includes a 32-bit LZD module 901 and a 27-bit LZD module 902. In double-precision operation, the lower 32 bits of the double-precision input 903 are processed in module 901, and the upper 24 bits are processed in module 902. The numbers will have grown by 3 bits after the mantissa addition, because of round and sticky bits, as well as the possible 1 bit growth in the addition. Therefore, in double-precision operation, the upper 3 bits of the leading-zero-detect will always be '0', so an adjustment must be made for the LZD value (by subtracting '3'). This adjustment can be made at the output of the high LZD module 902, or when the two outputs are combined at 911. In single-precision operation, mantissas 904, 905 are mapped to the most significant bits of their respective LZD module as discussed above, and therefore need no adjustment.

Structure 1000 of FIG. 10 is an example of a count-leading-zeroes structure (alternatively, a Leading-Zero Anticipator circuit can be used) for supporting all three precisions—i.e., including single-extended precision. This situation is more complicated, in part because, as noted above, there is no standard fixed format for single-extended precision. The only thing that is certain is that two LZD modules larger than 27 bits will be needed. In the example of structure 1000, two 32-bit LZD modules 1001, 1011 are provided for the low and high bits respectively.

According to this example, in the single-precision case, the two single-precision mantissas 1002, 1012—each 27 bits wide—are mapped to the most-significant bits of the two 32-bit LZD modules 1001, 1011 and the leading zeros count can be read directly from them. If the single-extended-precision mantissas 1022, 1032 were 32 bits wide or smaller, they could fit into LZD modules 1001, 1011 and nothing further would be needed. However, single-extended-precision mantissas 1022, 1032 can be 36 bits wide as shown.

Therefore, additional low-extension 4-bit LZD module 1021 and high-extension 4-bit LZD module 1031 are provided. The low and high single-extended-precision mantissas 1022, 1032 are aligned to the respective most-significant bits of low-extension LZD module 1021 and high-extension LZD module 1031, respectively, and mantissas 1022, 1032 extend as far over LZD modules 1001, 1011 as necessary. In the 36-bit example shown, the mantissas extend completely over modules 1001 and 1011. The count values are decoded and combined at 1004 for low-bit LZD module 1001 and low-extension LZD module 1021, and at 1014 for high-bit LZD module 1011 and high-extension LZD module 1031. If the mantissas are larger than 36-bits, the extension modules 1021, 1031 would be larger; maintaining the larger LZD modules 1001, 1011 at a radix boundary is more efficient. Alternatively (not shown), LZD modules 1001, 1011 could be expanded to 36 bits each and used for both the single-precision and single-extended-precision cases, although such implementations may be less efficient.

In the example of FIG. 10, double-precision mantissa 1042 is aligned to the least-significant bit of low-bit LZD module 1001 and spans not only low-bit LZD module 1001, but also low-extension LZD module 1021 and high-bit LZD module 1011. The count value is decoded at 1024 from high-bit LZD module 1011 and the decoded combination 1004 of low-bit LZD module 1001 and low-extension LZD module 1021.

Figure 11:
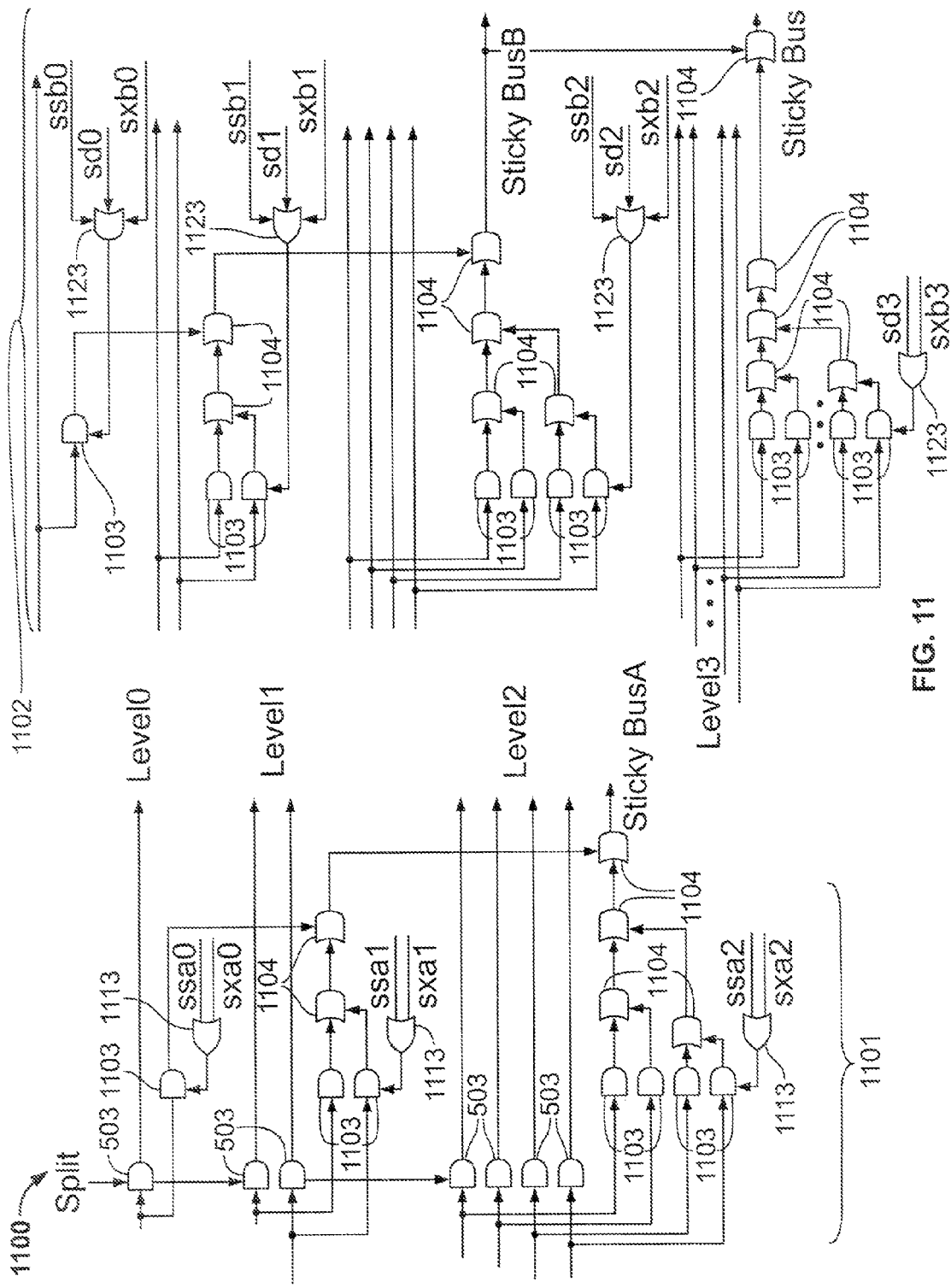
FIG. 11 is a schematic representation of a sticky bit structure that can be partitioned in accordance with embodiments of the present invention.

Another aspect of rounding is the calculation of the sticky bit, which signifies whether any further bits beyond the least significant bit being kept, is a '1' (this can be important when the bits being represent exactly $0.5_{10}$). One example of circuitry 1100 for calculating the sticky bit is shown in FIG. 11. Circuitry 1100 may work with shifter circuitry 500. Portion 1101, on the left, is for calculating the sticky bit for the left-hand portion in a single-precision or single-extended-precision case. As seen, the values that would be shifted further to the right but for the presence of split gates 503 are sampled for the presence of a '1' by ORing them all together. In this example, the bits from a particular level are included, under the control of AND-gates 1103, if the shift control bit $ssa_n$ or $sxa_n$ for that level is a '1' (tested by OR-gates 1113), and input to OR-gates 1104. If single-extended precision is not supported, then the $sxa_n$ bits need not be examined, and OR-gates 1113 can be omitted.

Portion 1102, on the right, is for calculating the sticky bit for the right-hand portion in a single-precision or single-extended-precision case, or for the double-precision case. In this case, the shift control bits controlling AND-gates 1103 include not only shift control bits $ssa_n$ or $sxa_n$ from the single-precision and single-extended-precision cases, but also $sd_n$ from the double-precision case. Here, even if single-extended precision is not supported, OR-gates 1123 are included because they are needed to select between $ssa_n$ or $sd_n$, except at the last level.

Thus it is seen how a specialized processing block such as block 100 can support multiple different levels of precision with little additional logic. As noted above, the particular examples described above for how the structures in the block may be partitioned are only examples, and other divisions among the structures may be implemented. Moreover, as noted, depending on the number of different precisions to be supported, certain structures may not be needed.

Figure 12:
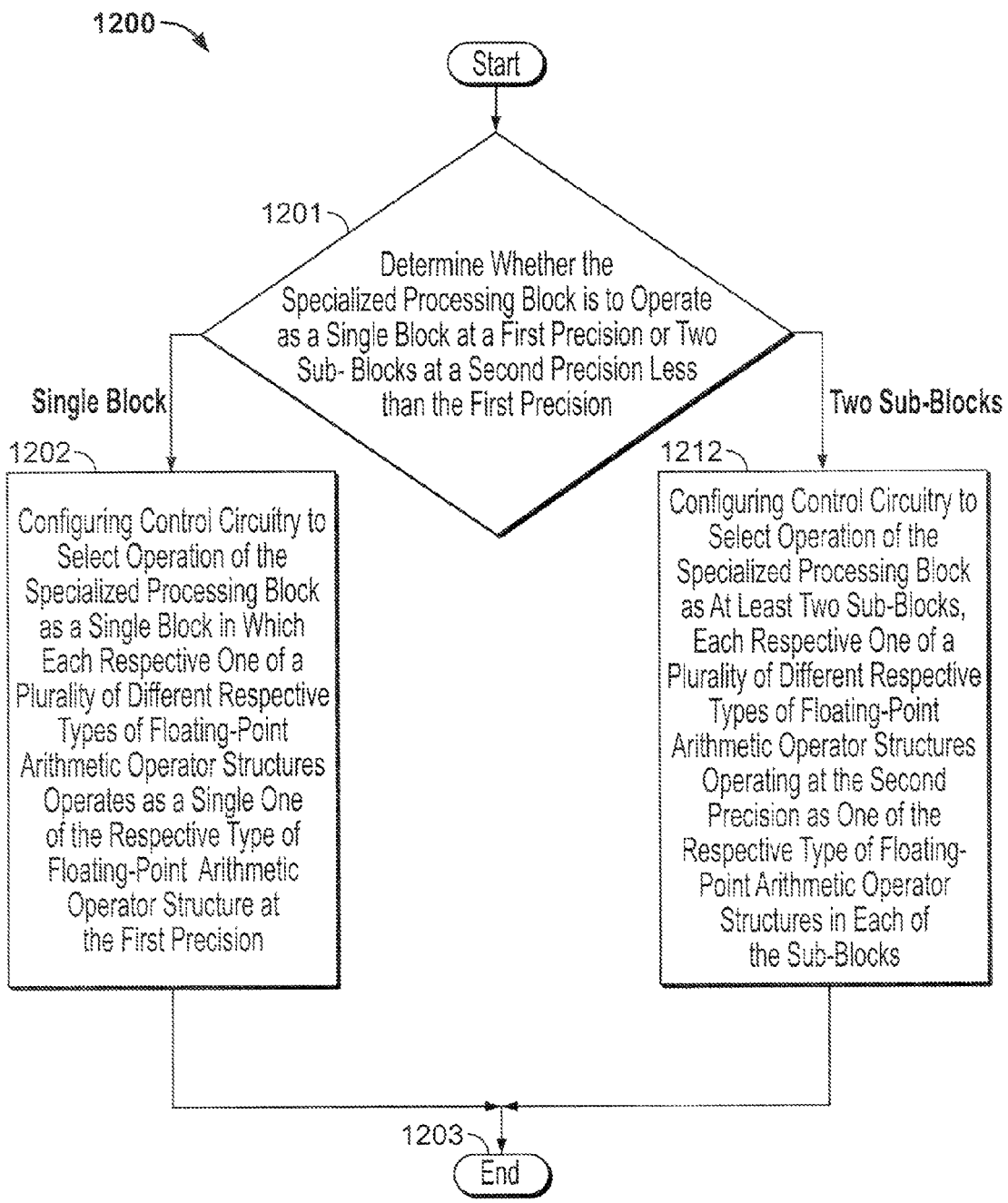
FIG. 12 is a flow diagram of an example of a method according to an embodiment of the present invention.

A method according to the invention configures a programmable integrated circuit device, such as a PLD, having such a block, to use the structures shown in FIGS. 3-11 to perform arithmetic operations at different levels of precision. One example 1200 of such a method is diagrammed in FIG. 12, and begins at 1201 where it is determined whether the specialized processing block is to operate as a single block at a first precision or at least two sub-blocks at a second precision less than the first precision. This determination may be made, for example, by examining a user input, for which a prompt may be presented (not shown).

If it is determined at 1201 that the specialized processing block is to operate as a single block, then at 1202, control circuitry is configured to select operation of the specialized processing block as a single block in which each respective one of a plurality of different respective types of floating-point arithmetic operator structures operates as a single one of the respective type of floating-point arithmetic operator structure at the first precision, and the method ends at 1203.

If it is determined at 1201 that the specialized processing block is to operate as at least two sub-blocks, then at 1212, control circuitry is configured to select operation of the specialized processing block as at least two sub-blocks, each respective one of a plurality of different respective types of floating-point arithmetic operator structures operating at the second precision as one of the respective type of floating-point arithmetic operator structures in each of the sub-blocks, and the method ends at 1203.

Instructions for carrying out the method according to this invention may be encoded on a machine-readable medium, to be executed by a suitable computer or similar device to implement the method of the invention for programming or configuring programmable integrated circuit devices to perform operations as described above. For example, a personal computer may be equipped with an interface to which a programmable integrated circuit device can be connected, and the personal computer can be used by a user to program the programmable integrated circuit device using a suitable software tool, such as the QUARTUS® II software available from Altera Corporation, of San Jose, Calif.

Figure 13:
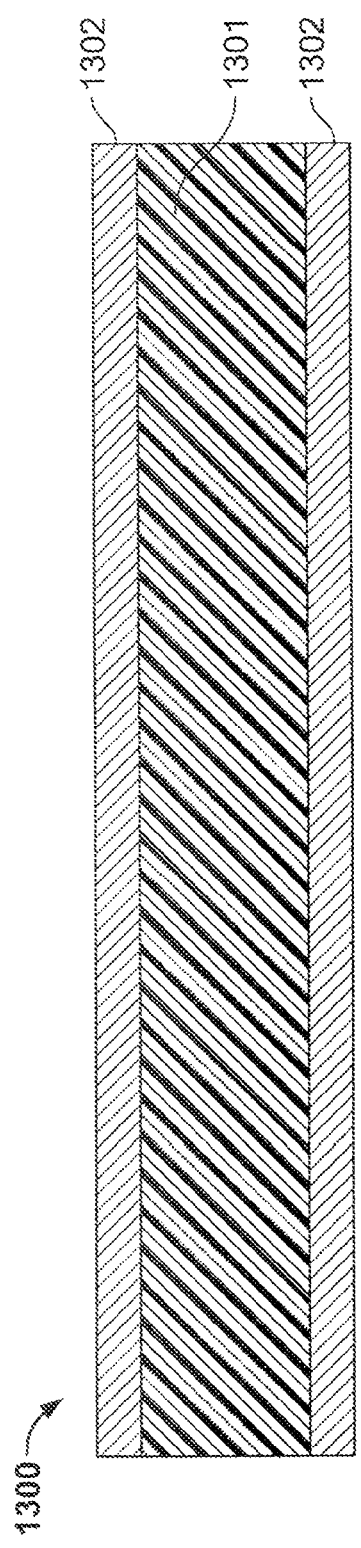
FIG. 13 is a cross-sectional view of a magnetic data storage medium encoded with a set of machine-executable instructions for performing the method according to the present invention.

FIG. 13 presents a cross section of a magnetic data storage medium 1300 which can be encoded with a machine executable program that can be carried out by systems such as the aforementioned personal computer, or other computer or similar device. Medium 1300 can be a floppy diskette or hard disk, or magnetic tape, having a suitable substrate 1301, which may be conventional, and a suitable coating 1302, which may be conventional, on one or both sides, containing magnetic domains (not visible) whose polarity or orientation can be altered magnetically. Except in the case where it is magnetic tape, medium 1300 may also have an opening (not shown) for receiving the spindle of a disk drive or other data storage device.

The magnetic domains of coating 1302 of medium 1300 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 14:
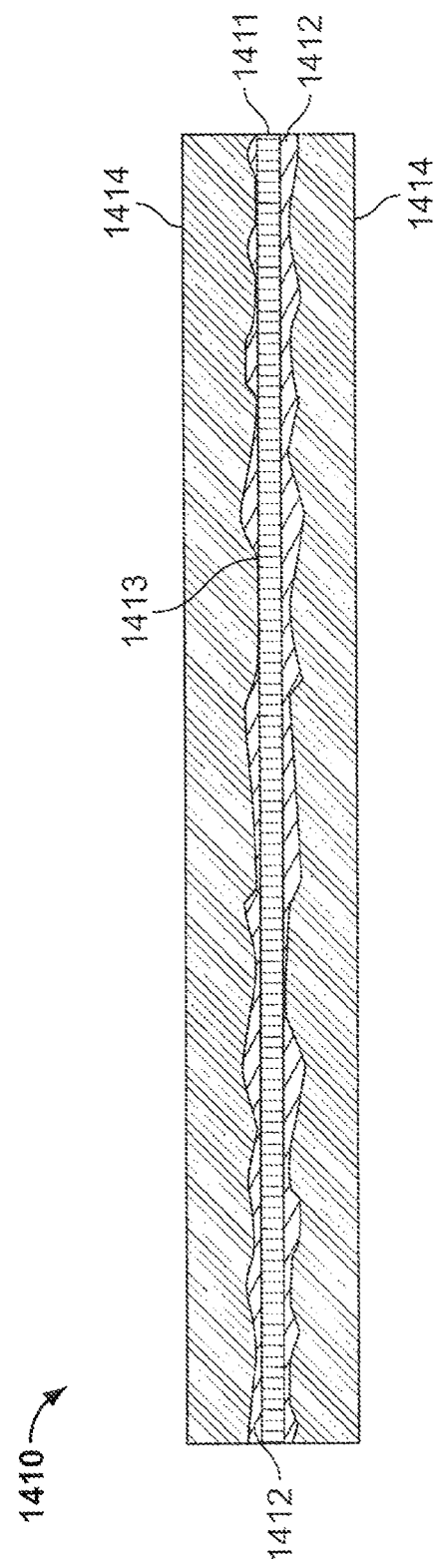
FIG. 14 is a cross-sectional view of an optically readable data storage medium encoded with a set of machine executable instructions for performing the method according to the present invention.

FIG. 14 shows a cross section of an optically-readable data storage medium 1410 which also can be encoded with such a machine-executable program, which can be carried out by systems such as the aforementioned personal computer, or other computer or similar device. Medium 1410 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1410 preferably has a suitable substrate 1411, which may be conventional, and a suitable coating 1412, which may be conventional, usually on one or both sides of substrate 1411.

In the case of a CD-based or DVD-based medium, as is well known, coating 1412 is reflective and is impressed with a plurality of pits 1413, arranged on one or more layers, to encode the machine-executable program. The arrangement of pits is read by reflecting laser light off the surface of coating 1412. A protective coating 1414, which preferably is substantially transparent, is provided on top of coating 1412.

In the case of magneto-optical disk, as is well known, coating 1412 has no pits 1413, but has a plurality of magnetic domains whose polarity or orientation can be changed magnetically when heated above a certain temperature, as by a laser (not shown). The orientation of the domains can be read by measuring the polarization of laser light reflected from coating 1412. The arrangement of the domains encodes the program as described above.

Thus it is seen that a method for efficiently carrying out large multiplications in a programmable integrated circuit device, a programmable integrated circuit device programmed to perform the method, and software for carrying out the programming, have been provided.

Figure 15:
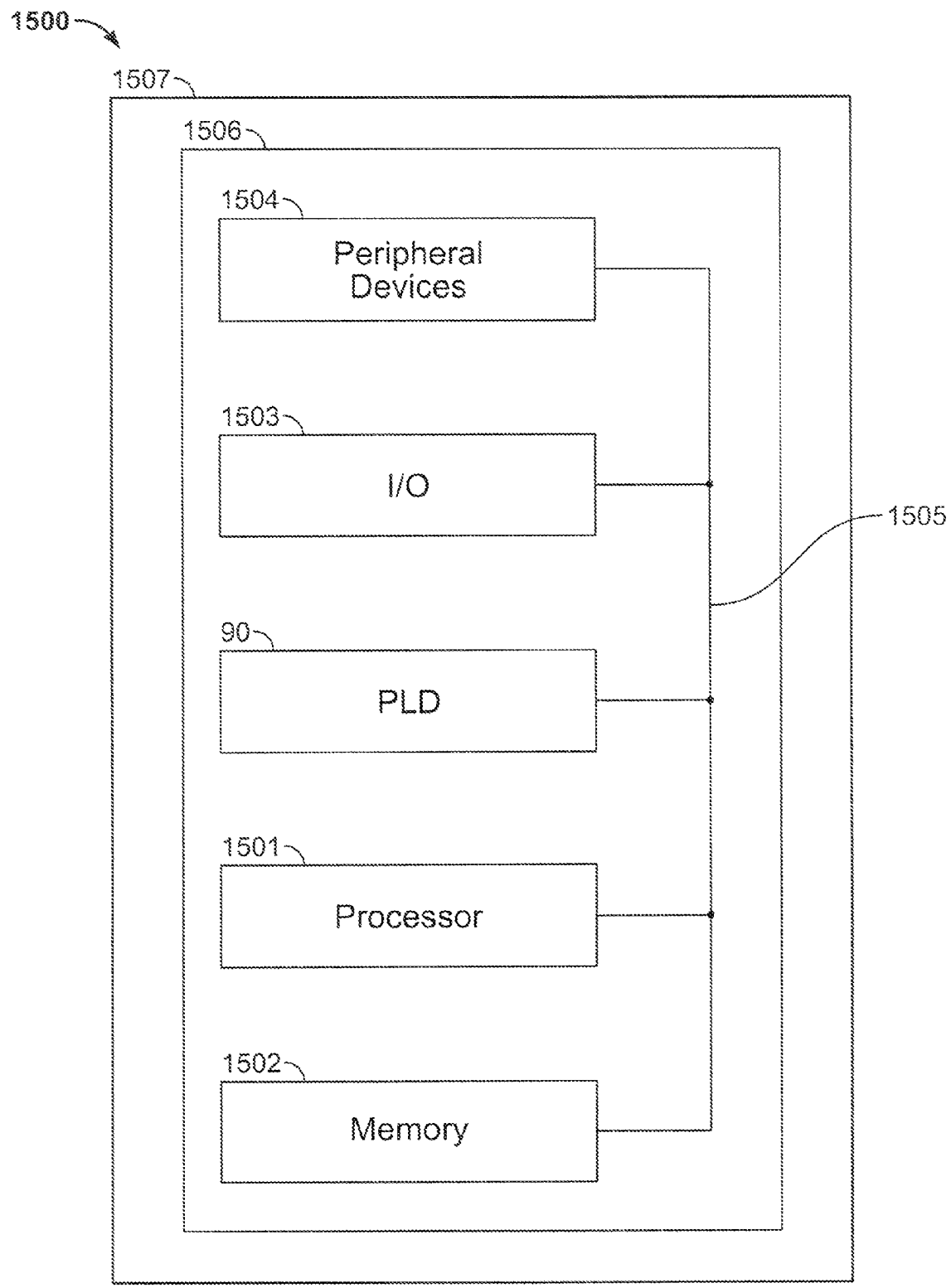
FIG. 15 is a simplified block diagram of an illustrative system employing a programmable logic device incorporating the present invention.

A PLD 90 programmed according to the present invention may be used in many kinds of electronic devices. One possible use is in a data processing system 1500 shown in FIG. 15. Data processing system 1500 may include one or more of the following components: a processor 1501; memory 1502; I/O circuitry 1503; and peripheral devices 1504. These components are coupled together by a system bus 1505 and are populated on a circuit board 1506 which is contained in an end-user system 1507.

System 1500 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 1401. PLD 90 may also be used as an arbiter for arbitrating access to a shared resources in system 1500. In yet another example, PLD 90 can be configured as an interface between processor 1501 and one of the other components in system 1500. It should be noted that system 1500 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a programmable integrated circuit device in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A specialized processing block for performing floating-point arithmetic operations at selectable different precisions in a programmable integrated circuit device, said specialized processing block comprising:
   a plurality of different respective types of floating-point arithmetic operator circuit structures, each respective type of floating-point arithmetic operator circuit structure performing a different type of operation than each other type of floating-point arithmetic operator circuit structure; and
   for each respective type of floating-point arithmetic operator circuit structure, respective control circuitry within said floating-point arithmetic circuit structure for partitioning said respective type of floating-point arithmetic operator circuit structure to select between a first precision for which said respective type of floating-point arithmetic operator structure is not partitioned, and at least a second precision, less than said first precision, for which said respective type of floating-point arithmetic operator structure is partitioned into at least two smaller ones of said respective type of floating-point arithmetic operator circuit structure.

2. The specialized processing block of claim 1 wherein said plurality of different types of floating-point arithmetic operator circuit structures include at least one multiplier circuit structure and at least one adder circuit structure.

3. The specialized processing block of claim 2 wherein at least one of said at least one adder circuit structure includes shifting circuitry and rounding circuitry.

4. The specialized processing block of claim 3 wherein said rounding circuitry is selected from the group consisting of count-leading-zeroes circuitry, sticky bit circuitry, and combinations thereof.

5. The specialized processing block of claim 1 wherein said selectable different precisions comprise single precision and double precision.

6. The specialized processing block of claim 5 wherein said selectable different precisions further comprise single-extended precision.

7. The specialized processing block of claim 1 wherein said control circuitry for partitioning comprises circuitry for aligning portions of inputs into said respective type of floating-point arithmetic operator circuit structure to selected bits of said smaller ones of said respective type of floating-point arithmetic operator circuit structure.

8. The specialized processing block of claim 7 wherein said selected bits comprise least significant bits.

9. The specialized processing block of claim 7 wherein said selected bits comprise most significant bits.

10. The specialized processing block of claim 1 wherein:
   each said respective type of floating-point arithmetic operator circuit structure includes at least two portions, each of said portions functioning as one of said smaller ones of said respective type of floating-point arithmetic operator circuit structure and having conductors connecting to at least one other one of said portions; and
   said control circuitry for partitioning comprises a plurality of logic gates, each located on one of said conductors, for opening and closing said conductors; wherein:

when said logic gates open said conductors, said respective type of floating-point arithmetic operator circuit structure is partitioned into said smaller ones of said respective type of floating-point arithmetic operator circuit structure; and when said logic gates close said conductors, said respective type of floating-point arithmetic operator circuit structure is not partitioned into said smaller ones of said respective type of floating-point arithmetic operator circuit structure.

11. The specialized processing block of claim 10 wherein said logic gates are AND-gates.

12. A method of configuring a programmable integrated circuit device to perform arithmetic operations at selectable different precisions, said programmable integrated circuit device including a specialized processing block, said specialized processing block comprising:

a plurality of different respective types of floating-point arithmetic operator circuit structures, each respective type of floating-point arithmetic operator circuit structure performing a different type of operation than each other type of floating-point arithmetic operator circuit structure, and for each respective type of floating-point arithmetic operator circuit structure, respective control circuitry within said floating-point arithmetic circuit structure for partitioning said respective type of floating-point arithmetic operator circuit structure to select between a first precision for which said respective type of floating-point arithmetic operator circuit structure is not partitioned, and at least a second precision, less than said first precision, for which said respective type of floating-point arithmetic operator circuit structure is partitioned into at least two smaller ones of said respective type of floating-point arithmetic operator circuit structure, said method comprising:

configuring said respective control circuitry within said floating-point arithmetic circuit structure to select between operation of said specialized processing block as a single block in which each respective one of said plurality of different respective types of floating-point arithmetic operator circuit structures operates as a single one of said respective type of floating-point arithmetic operator circuit structure at said first precision, and operation of said specialized processing block as at least two sub-blocks, each respective one of said plurality of different respective types of floating-point arithmetic operator circuit structures operating at said second precision as one of said respective type of floating-point arithmetic operator circuit structures in each of said sub-blocks.

13. The method of claim 12 wherein said plurality of different types of floating-point arithmetic operator circuit structures include at least one multiplier circuit structure and at least one adder circuit structure.

14. The method of claim 12 wherein at least one of said at least one adder circuit structure includes shifting circuitry and rounding circuitry.

15. The method of claim 14 wherein said rounding circuitry is selected from the group consisting of count-leading-zeroes circuitry, sticky bit circuitry, and combinations thereof.

16. The method of claim 12 wherein said configuring operation of said specialized processing block as a single block at said first precision comprises configuring said specialized block to operate at double precision.

17. The method of claim 16 wherein said configuring operation of said specialized processing block as at least two sub-blocks at said second precision comprises configuring said at least two sub-blocks to operate at one of selectable different precisions including single precision and single-extended precision.

18. The method of claim 12 wherein said configuring comprises:

partitioning said specialized processing block into at least two sub-blocks by partitioning each respective one of said plurality of different respective types of floating-point arithmetic operator circuit structures to operate as at least two of smaller ones of said respective type of floating-point arithmetic operator circuit structures; and aligning portions of inputs into said respective type of floating-point arithmetic operator circuit structure to selected bits of said smaller ones of said respective type of floating-point arithmetic operator circuit structure.

19. The method of claim 18 wherein said selected bits comprise least significant bits.

20. The method of claim 18 wherein said selected bits comprise most significant bits.

21. The method of claim 12 wherein:

each said respective type of floating-point arithmetic operator circuit structure in said specialized processing block includes at least two portions, each of said portions functioning as one of said smaller ones of said respective type of floating-point arithmetic operator circuit structure and having conductors connecting to at least one other one of said portions, and said control circuitry for partitioning comprises a plurality of logic gates, each located on one of said conductors, for opening and closing said conductors; and said configuring said respective control circuitry within said floating-point arithmetic circuit structure to select between operation of said specialized processing block as said single block, and operation of said specialized processing block as at least two sub-blocks, comprises causing said logic gates to close said conductors for operation of said specialized processing block as said single block, and causing said logic gates to open said conductors for operation of said specialized processing block as said sub-blocks.

22. A non-transitory machine-readable storage medium encoded with instructions for performing a method of configuring a programmable integrated circuit device to perform arithmetic operations at selectable different precisions, said programmable integrated circuit device including a specialized processing block, said specialized processing block comprising a plurality of different respective types of floating-point arithmetic operator circuit structures, each respective type of floating-point arithmetic operator circuit structure performing a different type of operation than each other type of floating-point arithmetic operator circuit structure, and for each respective type of floating-point arithmetic operator circuit structure, respective control circuitry within said floating-point arithmetic circuit structure for partitioning said respective type of floating-point arithmetic operator circuit structure to select between a first precision for which said respective type of floating-point arithmetic operator circuit structure is not partitioned, and at least a second precision, less than said first precision, for which said respective type of floating-point arithmetic operator circuit structure is partitioned into at least two smaller ones of said respective type of floating-point arithmetic operator circuit structure, said instructions comprising:

instructions to configure said respective control circuitry within said floating-point arithmetic circuit structure to select between operation of said specialized processing block as a single block in which each respective one of said plurality of different respective types of floating-point arithmetic operator circuit structures operates as a single one of said respective type of floating-point arithmetic operator circuit structure at said first precision, and operation of said specialized processing block as at least two sub-blocks, each respective one of said plurality of different respective types of floating-point arithmetic operator circuit structures operating at said second precision as one of said respective type of floating-point arithmetic operator circuit structures in each of said sub-blocks.

23. The non-transitory machine-readable storage medium of claim 22 wherein said instructions comprise instructions selecting a plurality of different types of floating-point arithmetic operator circuit structures including at least one multiplier circuit structure and at least one adder circuit structure.

24. The non-transitory machine-readable storage medium of claim 23 wherein said instructions selecting a plurality of different types of floating-point arithmetic operator circuit structures including at least one multiplier circuit structure and at least one adder circuit structure comprise instructions to configure at least one of said at least one adder circuit structure to include shifting circuitry and rounding circuitry.

25. The non-transitory machine-readable storage medium of claim 23 wherein said instructions to configure at least one of said at least one adder circuit structure to include shifting circuitry and rounding circuitry comprise instructions selecting rounding circuits from the group consisting of count-leading-zeroes circuitry, sticky bit circuitry, and combinations thereof.

26. The non-transitory machine-readable storage medium of claim 22 wherein said instructions to configure operation of said specialized processing block as a single block at said first precision comprise instructions to configure said specialized block to operate at double precision.

27. The non-transitory machine-readable storage medium of claim 26 wherein said instructions to configure operation of said specialized processing block as at least two sub-blocks at said second precision comprise instructions to configure said at least two sub-blocks to operate at one of selectable different precisions including single precision and single-extended precision.

28. The non-transitory machine-readable storage medium of claim 22 wherein said instructions to configure comprise:
  instructions to partition said specialized processing block into at least two sub-blocks by partitioning each respective one of said plurality of different respective types of floating-point arithmetic operator circuit structures to operate operating as at least two of smaller ones of said respective type of floating-point arithmetic operator circuit structures; and
  instructions to align portions of inputs into said respective type of floating-point arithmetic operator circuit structure to selected bits of said smaller ones of said respective type of floating-point arithmetic operator circuit structure.

29. The non-transitory machine-readable storage medium of claim 28 wherein said selected bits comprise least significant bits.

30. The non-transitory machine-readable storage medium of claim 28 wherein said selected bits comprise most significant bits.

31. The non-transitory machine-readable storage medium of claim 22 wherein:
  each said respective type of floating-point arithmetic operator circuit structure in said specialized processing block includes at least two portions, each of said portions functioning as one of said smaller ones of said respective type of floating-point arithmetic operator circuit structure and having conductors connecting to at least one other one of said portions, and said control circuitry for partitioning comprises a plurality of logic gates, each located on one of said conductors, for opening and closing said conductors; and
  said instructions to configure said respective control circuitry within said floating-point arithmetic circuit structure to select between operation of said specialized processing block as said single block, and operation of said specialized processing block as at least two sub-blocks, comprise instructions to cause said logic gates to close said conductors for operation of said specialized processing block as said single block, and instructions to cause said logic gates to open said conductors for operation of said specialized processing block as said sub-blocks.

* * * * *